US012731527B2

(12) United States Patent
Zeng et al.

(10) Patent No.: US 12,731,527 B2
(45) Date of Patent: Sep. 8, 2026

(54) DISPLAY BACKPLANE AND DISPLAY DEVICE

(71) Applicant: Wuhan China Star Optoelectronics Semiconductor Display Technology Co., Ltd., Wuhan (CN)

(72) Inventors: Mian Zeng, Wuhan (CN); Liang Sun, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/557,055

(22) PCT Filed: Jul. 20, 2023

(86) PCT No.: PCT/CN2023/108485
§ 371 (c)(1),
(2) Date: Oct. 25, 2023

(87) PCT Pub. No.: WO2024/254940
PCT Pub. Date: Dec. 19, 2024

(65) Prior Publication Data

US 2026/0087970 A1 Mar. 26, 2026

(30) Foreign Application Priority Data

Jun. 16, 2023 (CN) ......................... 202310722947.2

(51) Int. Cl.
*G09G 3/32* (2016.01)
*G09G 3/20* (2006.01)

(52) U.S. Cl.
CPC ............. *G09G 3/32* (2013.01); *G09G 3/2074* (2013.01); *G09G 2310/0286* (2013.01); *G09G 2310/08* (2013.01); *G09G 2320/0242* (2013.01)

(58) Field of Classification Search
CPC ... G09G 2320/0233; G09G 2300/0842; G09G 3/3241; G09G 2310/0262; G09G 2300/0861; G09G 3/325; G09G 2310/027; G09G 2320/043; G09G 3/2014; G09G 2320/0223; G09G 3/3283; G09G 3/32; G09G 2310/0297; G09G 2320/0242; G09G 2320/0238; G09G 2320/0626;
(Continued)

(56) References Cited

U.S. PATENT DOCUMENTS

2004/0080471 A1* 4/2004 Kim ..................... G09G 3/3283 345/76
2005/0174307 A1* 8/2005 Nishitoba ............. G09G 3/325 345/76
(Continued)

*Primary Examiner* — Sujit Shah
(74) *Attorney, Agent, or Firm* — Nathan & Associates Patent Agents Ltd.; Menachem Nathan

(57) ABSTRACT

A display backplane and a display device are provided. The display backplane includes sub-pixel units and a mirror current source module. Each sub-pixel unit includes a pixel drive circuit with an adjustment module and a light-emitting device. The mirror current source module is electrically connected to the adjustment modules in multiple pixel drive circuits and is used to adjust the adjustment currents input to the adjustment modules. The mirror current source module inputs different adjustment currents to the sub-pixel units of different colors.

13 Claims, 7 Drawing Sheets

(58) Field of Classification Search
CPC ..... G09G 2320/066; G09G 2320/0252; G09G 3/204; G09G 3/2074; G09G 3/3208
See application file for complete search history.

(56) References Cited

U.S. PATENT DOCUMENTS

| | | | | |
|---|---|---|---|---|
| 2005/0225517 | A1* | 10/2005 | Sun | G09G 3/3283 345/76 |
| 2007/0205968 | A1* | 9/2007 | Chen | G09G 3/2003 345/76 |
| 2013/0181967 | A1* | 7/2013 | Lee | G09G 3/3258 345/212 |
| 2015/0008405 | A1* | 1/2015 | Kim | G09G 3/3291 257/40 |
| 2020/0365070 | A1* | 11/2020 | Jeong | G09G 3/3208 |
| 2022/0122547 | A1* | 4/2022 | Yu | G09G 3/3275 |
| 2022/0415227 | A1* | 12/2022 | Cho | G06F 1/1624 |

* cited by examiner

DISPLAY BACKPLANE AND DISPLAY DEVICE

TECHNICAL FIELD

The present application relates to a field of display technology, and in particular, to a display backplane and a display device.

DESCRIPTION OF RELATED ART

Micro light-emitting diodes (LEDs), such as Mini LED and Micro LED, have significant advantages in terms of higher brightness, better luminous efficiency, and lower power consumption. Micro LEDs have become a focal point of research in the display panel industry.

Currently, for monochromatic array display driving of micro LEDs, digital subfield scanning is commonly used for monochrome display. However, as the demand for higher display panel resolutions, frame rates, and grayscale levels increases, and in order to achieve full RGB color display with 256 grayscale levels for each red, green, and blue (RGB) subpixel, currently-used clock frequencies are unable to meet the requirements of full-color displays.

Therefore, there is an urgent need for a display backplane solution to address the aforementioned technical challenges.

SUMMARY OF INVENTION

The present application provides a display backplane and a display device to address the technical challenge of achieving full-color display due to the limitations of conventional display backplanes caused by clock frequency constraints.

In order to address the above technical challenge, the present application provides a technical solution as follows.

The present application provides a display backplane, including:

- a plurality of sub-pixel units, each of the sub-pixel units comprising a pixel drive circuit and a light-emitting device, wherein in each sub-pixel unit, the pixel drive circuit includes a signal receiving module, a signal storage module, a switch module, and an adjustment module, the signal receiving module receives a data signal from a data signal source and transmits the data signal to the signal storage module and the switch module, the signal storage module is configured to store the data signal, the switch module is configured to transmit an adjustment current from the adjustment module to the light-emitting device; and
- a mirror current source module, electrically connected to the adjustment modules of the pixel drive circuits, wherein the mirror current source module is configured to adjust the adjustment currents input to the adjustment modules;
- wherein the sub-pixel units include a plurality of first sub-pixel units, a plurality of second sub-pixel units, and a plurality of third sub-pixel units, wherein the first sub-pixel units, the second sub-pixel units, and the third sub-pixel unit emit different colors, and wherein the mirror current source module input different adjustment currents to the adjustment modules of the first sub-pixel units, the second sub-pixel units, and the third sub-pixel units.

The present application further provides a display device, including a display backplane, the display backplane including:

- a plurality of sub-pixel units, each of the sub-pixel units including a pixel drive circuit and a light-emitting device, wherein in each sub-pixel unit, the pixel drive circuit includes a signal receiving module, a signal storage module, a switch module, and an adjustment module, the signal receiving module receives a data signal from a data signal source and transmits the data signal to the signal storage module and the switch module, the signal storage module is configured to store the data signal, the switch module is configured to transmit an adjustment current from the adjustment module to the light-emitting device; and
- a mirror current source module, electrically connected to the adjustment modules of the pixel drive circuits, wherein the mirror current source module is configured to adjust the adjustment currents input to the adjustment modules;
- wherein the sub-pixel units include a plurality of first sub-pixel units, a plurality of second sub-pixel units, and a plurality of third sub-pixel units, wherein the first sub-pixel units, the second sub-pixel units, and the third sub-pixel unit emit different colors, and wherein the mirror current source module input different adjustment currents to the adjustment modules of the first sub-pixel units, the second sub-pixel units, and the third sub-pixel units.

DETAILED DESCRIPTION OF EMBODIMENTS

Figure 1:
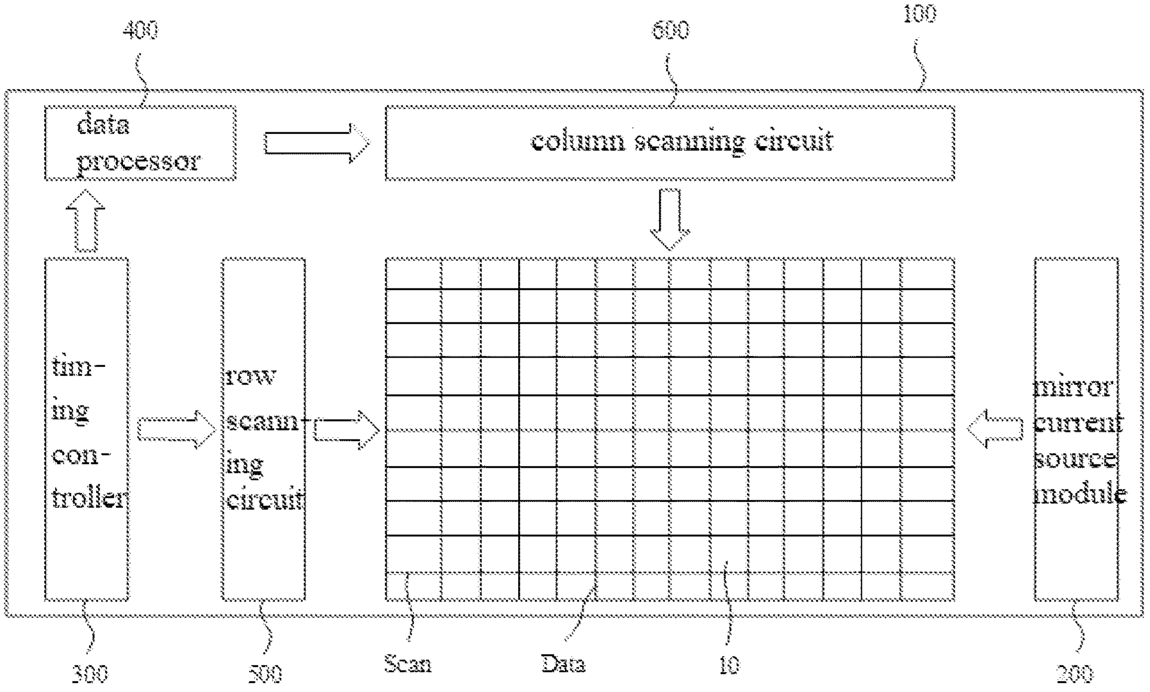
FIG. 1 is a schematic diagram illustrating a structure of a display backplane in the present application.

In order to make the purpose, technical solutions and effects of the present application clearer and more definite, the present application is further described in detail below with reference to the accompanying drawings and specific embodiments. It should be understood that the specific embodiments described here are only used to explain the present application and are not intended to limit the present application.

Currently, for monochromatic array display driving of micro light-emitting diodes (LEDs), the common practice is to use digital subfield scanning for monochrome display. However, with the increasing demands for display panel resolution, refresh frame rates, and grayscale levels, and in order to achieve full RGB color display with 256 grayscale levels for each RGB subpixel, the present clock frequencies are insufficient to meet the requirements of full-color display. Therefore, there is an urgent need for a display backplane to address the aforementioned technical challenges.

Please refer to FIG. 1 through FIG. 11. In this application, a display backplane 100 is provided, comprising multiple sub-pixel units 10 and a mirror current source module 200.

In this embodiment, each sub-pixel unit 10 includes a pixel drive circuit 110 and a light-emitting device LED. The pixel drive circuit 110 comprises a signal receiving module 111, a signal storage module 112, a switch module 113, and an adjustment module 114. The signal receiving module 111 receives data signals from a data signal source Data and transmits these data signals to the signal storage module 112 and the switch module 113. The signal storage module 112 is used for storing the data signals, and the switch module 113 is used to transmit an adjustment current from the adjustment module 114 to the light-emitting device LED.

In the present embodiment, the mirror current source module 200 is electrically connected to the adjustment module 114 in multiple pixel drive circuits 110, and the mirror current source module 200 is used to adjust the adjustment current input to the adjustment module 114.

In this embodiment, the sub-pixel units 10 include a plurality of first sub-pixel units 101 emitting a first color, a plurality of second sub-pixel units 102 emitting a second color, and a plurality of third sub-pixel units 103 emitting a third color. The light-emitting colors of the first sub-pixel units 101, the second sub-pixel units 102, and the third sub-pixel units 103 are different. For example, the first sub-pixel units 101 can be red sub-pixels, the second sub-pixel units 102 can be green sub-pixels, and the third sub-pixel units 103 can be blue sub-pixels. The mirror current source module 200 provides different adjustment currents to the adjustment modules 114 in the first sub-pixel units 101, the second sub-pixel units 102, and the third sub-pixel units 103.

It should be noted that the display backplane 100 can include a display area and a non-display area. The display area is provided with multiple scan lines and multiple data lines, which intersect to enclose multiple sub-pixel units 10. The pixel drive circuit 110 of each sub-pixel unit 10 is connected to the corresponding data line and scan line. The mirror current source module 200 is positioned in the non-display area to adjust operating currents of the light-emitting devices LED by adjusting the currents input to the adjustment modules 114. This adjustment is made to control the luminous flux of the light-emitting devices LED of different colors.

It should be noted that the display backplane 100 can be directly used as a display device. For example, the light-emitting devices LED of the display backplane 100 can be Mini LEDs or Micro LEDs, or the display backplane 100 can also serve as a backlight source for a liquid crystal display panel. Provided below is an explanation using the display backplane 100 as a direct display device as an example.

Please refer to FIG. 1. It should also be noted that the display backplane 100 can include a timing controller 300, a data processor 400, a row scanning circuit 500, and a column scanning circuit 600. The row scanning circuit 500 is connected to the scan lines in the display backplane 100, and the column scanning circuit 600 is connected to the data lines in the display backplane 100. The timing controller 300 transmits scan signals to the row scanning circuit 500, and controls the data processor 400 to transmit data signals to the column scanning circuit 600.

It should be noted that in this application, grayscale display can be achieved using subfield scanning. This means that the scanning time for each frame of a display image is divided into different-sized subfields, and each subfield is separately controlled to emit light. The light emission time for each subfield is combined to control the total light emission time within that frame. This allows for control of the illumination time of each display unit in the display panel, resulting in different grayscale values for each display unit.

It should also be noted that each sub-pixel unit 10 includes multiple frames of display data. Each frame of display data includes multiple subframes, each subframe consisting of a data writing phase t1 and an illumination phase t2. An illumination duration during the illumination phase t2 varies among different subframes. Furthermore, weighting values for each subframe are different, meaning that the duration of the illumination phase t2 for each subframe varies, resulting in different illumination durations for the LED light-emitting devices. The weighting values can be set using standard binary-weighted incrementing values or non-standard binary-weighted incrementing values.

Figure 2:
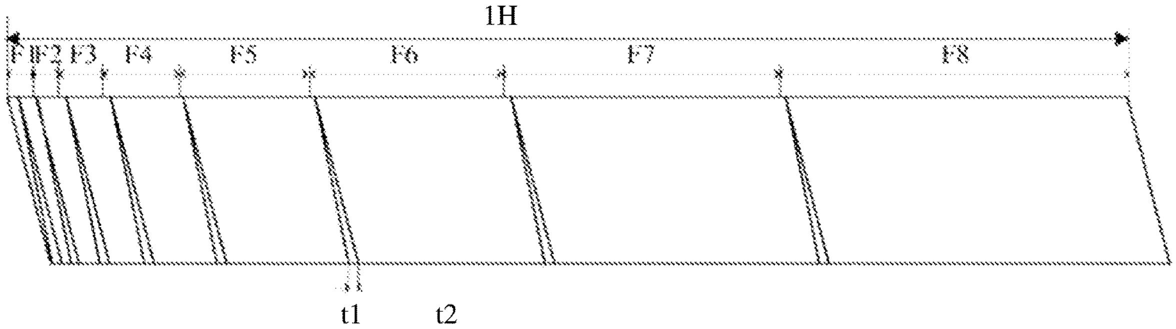
FIG. 2 is a subfield segmentation diagram of one frame of display data in the display backplane of the present application.

In the structure shown in FIG. 2, one frame of 1H display data consists of 8 subframes, namely, subframes F1, F2, F3, F4, F5, F6, F7, and F8. These subframes are assigned weights in accordance with the standard binary-weighted incrementing method, with the weight ratios for each subframe being $1(2^0):2(2^1):4(2^2):8(2^3):16(2^4):32(2^5):64(2^6):128(2^7)$. One frame of 1H display data is the grayscale superposition of each subframe, thereby achieving 255 grayscale display. To enhance the luminous brightness for the sub-pixel units 10 at L255 grayscale values, during the scanning of each row of the sub-pixel units 10 by the scan signals, the sub-pixel units 10 in each row emit light after the addressing scan time. Each sub-pixel unit 10 can continuously emit light throughout the entire driving time of the entire frame of the display image.

That is, when the data signal received by the sub-pixel unit 10 during the data writing phase t1 from the data signal source Data is at a high level, the sub-pixel unit 10 continuously emits light during the corresponding illumination phase t2. When the data signal received by the sub-pixel unit 10 during the data writing phase t1 from the data signal source Data is at a low level, the sub-pixel unit 10 does not emit light during the corresponding illumination phase t2. Alternatively, when the data signal received by the sub-pixel unit 10 during the data writing phase t1 from the data signal source Data is at a low level, the sub-pixel unit 10 continuously emits light during the corresponding illumination phase t2, while when the data signal received by the sub-pixel unit 10 during the data writing phase t1 from the data signal source Data is at a high level, the sub-pixel unit 10 does not emit light during the corresponding illumination phase t2.

For example, to achieve a display frequency of 60 Hz and grayscale adjustment of 256 levels for a single green Micro LED array with a resolution of 1280×1024, 8 subfields (denoted as subfields 1 to 8) constitutes one frame, where the illumination phases t2 of the 8 subfields are set in the ratio of 1:2:4:8:16:32:64:128, and the data input for the 8 subfields from the data signal source Data are denoted as d1 to d8, the grayscale calculation can be expressed as follows:

$$\text{Grayscale (Gray)} = 1*d1 + 2*d2 + 4*d3 + 8*d4 + 16*d5 + 32*d6 + 64*d7 + 128*d8.$$

For example, when the data input for the m-th subfield from the data signal source Data is at a high level, dm=1; when the data input for the m-th subfield from the data signal source Data is at a low level, dm=0. When the data input for all subfields from the data signal source Data are at a high level, meaning d1 to d8 are all set to 1, then Gray=256. When the data input for all subfields from the data signal source Data are at a low level, meaning d1 to d8 are all set to 0, then Gray=0.

It should be noted that in full-color displays, white light (W) is obtained by combining the three primary colors: red (R), green (G), and blue (B). Under fixed color coordinate specifications, their luminous flux ratios are also constant. For example, under color coordinate specifications such as W(0.300, 0.315), R(0.682, 0.317), G(0.250, 0.710), and B(0.138, 0.051), the luminous flux ratio of RGB is ΦR:ΦG:ΦB=3.18:9.27:1.

However, in this application, RGB luminous flux and grayscale are separately controlled. Grayscale is controlled using subfield scanning. Luminous flux is regulated by incorporating the mirror current source module 200 in the display backplane 100, which is connected to the adjustment modules 114 in the pixel drive circuits 110. This allows for the adjustment of the currents input to the light-emitting devices LED in the pixel drive circuits 110 of different sub-pixel units 10, so that the light-emitting devices LED emit light at predetermined ratios for different colors. This ensures that the light-emitting devices LED of different colors achieve the desired luminous flux, enabling the display backplane 100 to achieve full-color display at conventional clock frequency.

It should be noted that the arrangement of the sub-pixel units 10 in this application is not specifically limited, and the following explanation uses the standard RGB arrangement as an example.

The technical solution of the present application is described below with reference to specific embodiments.

Figure 3:
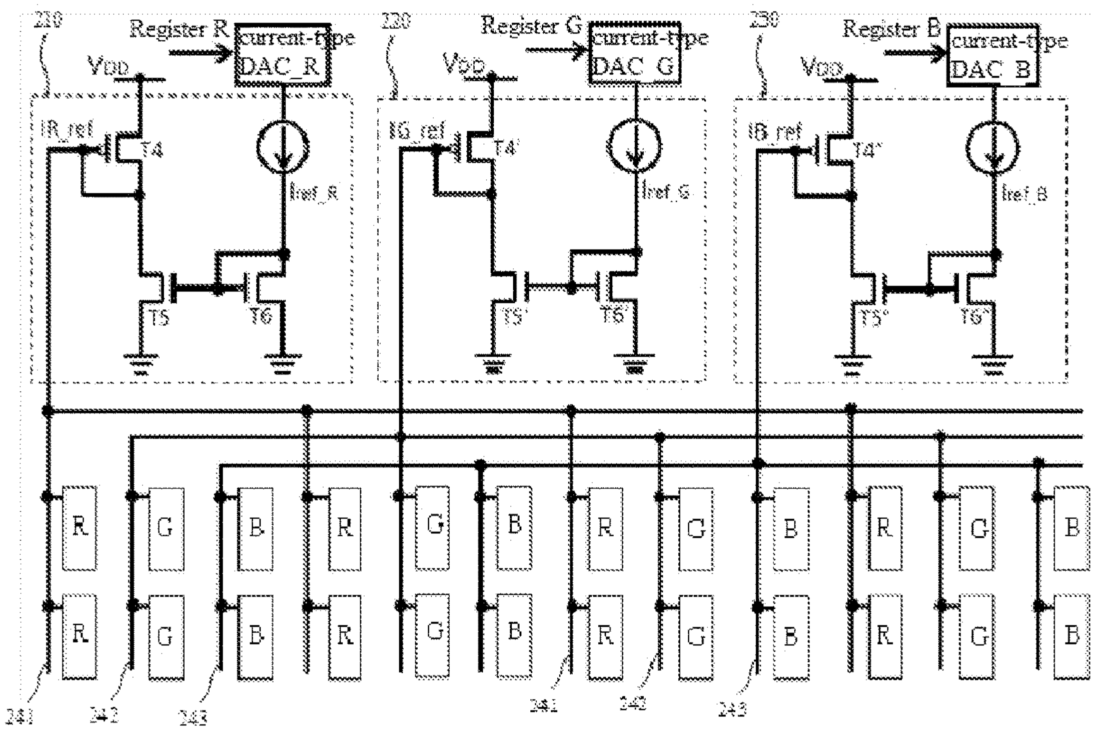
FIG. 3 is a schematic diagram illustrating a first type of a mirror current source module and its circuit connection in the display backplane of the present application.

Please refer to FIG. 3. The sub-pixel units 10 comprise multiple first sub-pixel units 101 emitting a first color, multiple second sub-pixel units 102 emitting a second color, and multiple third sub-pixel units 103 emitting a third color. The light-emitting colors of the first sub-pixel units 101, the second sub-pixel units 102, and the third sub-pixel units 103 are different. For example, the first sub-pixel units 101 may be red sub-pixels, the second sub-pixel units 102 may be green sub-pixels, and the third sub-pixel units 103 may be blue sub-pixels.

In this embodiment, the mirror current source module 200 can include a first mirror current unit 210, a second mirror current unit 220, and a third mirror current unit 230. The first mirror current unit 210 is connected to the adjustment modules 114 of at least one column of the first sub-pixel units 101. The second mirror current unit 220 is connected to the adjustment modules 114 of at least one column of the second sub-pixel units 102. The third mirror current unit 230 is connected to the adjustment modules 114 of at least one column of the third sub-pixel units 103.

In this embodiment, the display backplane 100 can also include a plurality of first transmission lines 241, a plurality of second transmission lines 242, and a plurality of third transmission lines 243, where each transmission line is for a column of the sub-pixel units 10. For example, in the structure shown in FIG. 3, one first transmission line 241 is connected to a column of the adjustment modules 114 of the red sub-pixels, one second transmission line 242 is connected to a column of the adjustment modules 114 of the green sub-pixels, and one third transmission line 243 is connected to a column of the adjustment modules 114 of the blue sub-pixels. The number of columns of the red sub-pixels matches the quantity of first transmission lines 241, the number of columns of the green sub-pixels matches the quantity of second transmission lines 242, and the number of columns of the blue sub-pixels matches the quantity of third transmission lines 243.

In this embodiment, the first transmission lines 241 are connected in parallel, the second transmission lines 242 are connected in parallel, and the third transmission lines 243 are connected in parallel. The first mirror current unit 210 is connected to the first transmission lines 241, the second mirror current unit 220 is connected to the second transmission lines 242, and the third mirror current unit 230 is connected to the third transmission lines 243. In other words, in the display backplane 100, the currents for all adjustment modules 114 in the red sub-pixels are controlled by the first mirror current unit 210, the currents for all adjustment modules 114 in the green sub-pixels are controlled by the second mirror current unit 220, and the currents for all adjustment modules 114 in the blue sub-pixels are controlled by the third mirror current unit 230.

In the present embodiment, the first transmission lines 241, the second transmission lines 242, and the third transmission lines 243 can be set on different layers. For example, multiple source-drain layers can be provided, and the first transmission lines 241, the second transmission lines 242, and the third transmission lines 243 can be placed in different source-drain layers, or the first, second, and third transmission lines 241, 242, 243 can be placed in the same source-drain layer, and metal bridges can be used at the intersections of the transmission lines for connection.

In the present embodiment, since the extension direction of the first transmission lines 241, the second transmission lines 242, and the third transmission lines 243 can be the same as the extension direction of the data lines and constant voltage high-level lines. The voltage transmitted in the transmission lines and the constant voltage high-level lines is constant. The transmission lines and constant voltage high-level lines can be placed on two sides of the data lines, thereby canceling out the coupling capacitance generated by the data lines with the transmission lines and the constant voltage high-level lines on two sides of the data lines.

In the display backplane 100 of this application, a first end of the signal receiving module 111 is connected to a scan signal source Scan. A second end of the signal receiving module 111 is connected to the data signal source Data. A third end of the signal receiving module 111, a first end of the signal storage module 112, and a first end of the switch module 113 are connected to the first node Q. A second end of the switch module 113 is connected to the adjustment module 114. A third end of the switch module 113 is connected to the light-emitting device LED. A second end of the signal storage module 112 and the adjustment module 114 are connected to a constant voltage high-level source VDD.

Figure 4:
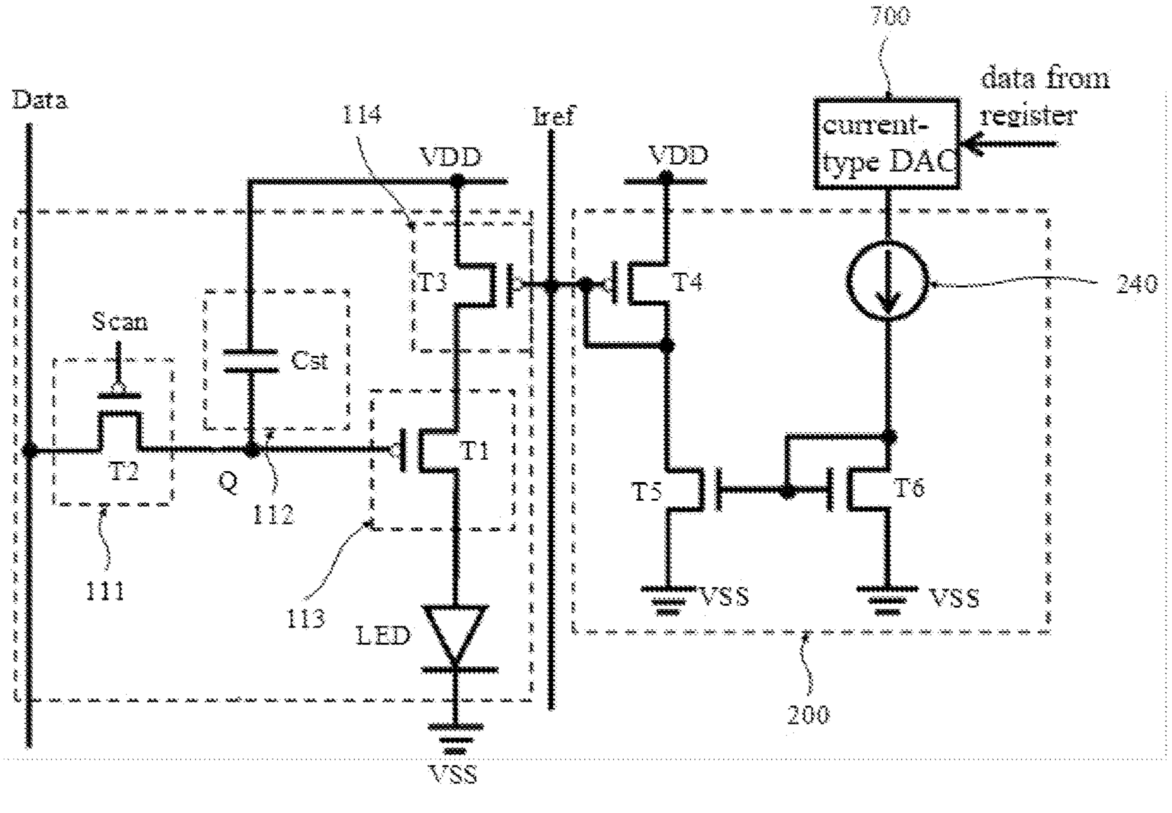
FIG. 4 is a connection diagram illustrating a first type connection between a pixel drive circuit and a mirror current unit in the display backplane of the present application.

Please refer to FIG. 4. The switch module 113 can include a first transistor T1. The signal receiving module 111 includes a second transistor T2. The adjustment module 114 includes a third transistor T3. The signal storage module 112 includes a storage capacitor Cst.

In this embodiment, as shown in FIG. 4, a gate of the second transistor T2 is connected to the scan signal source, a source of the second transistor T2 is connected to the data signal source Data, and a drain of the second transistor T2 is connected to a first electrode of the storage capacitor Cst and a gate of the first transistor T1. A source of the first transistor T1 is connected to a drain of the third transistor T3, a drain of the first transistor T1 is connected to an anode of the light-emitting device LED, and a source of the third transistor T3 is connected to the constant voltage high-level source VDD and a second electrode of the storage capacitor Cst. A gate of the third transistor T3 is connected to the mirror current source module 200.

In this embodiment, as shown in FIG. 4, the mirror current unit in the mirror current source module 200 includes a current source 240, a fourth transistor T4, a fifth transistor T5, and a sixth transistor T6. A first end of the current source 240 is connected to a digital-to-analog converter. A second end of the current source 240 is connected to a gate of the fifth transistor T5, a gate of the sixth transistor T6, and a source of the sixth transistor T6. Drains of the fifth transistor T5 and the sixth transistor T6 are connected to a constant voltage low-level source VSS. A source of the fifth transistor T5 is connected to the gate of the third transistor T3, a gate of the fourth transistor T4, and a drain of the fourth transistor T4. A source of the fourth transistor T4 is connected to the constant voltage high-level source VDD.

In the present embodiment, the digital-to-analog converter 700 is a current-type DAC, and different mirror current units have different digital-to-analog converters 700. Different color sub-pixels are separately controlled by different current-type DACs. For example, the first mirror current unit 210 includes a current-type DAC corresponding to the red sub-pixels, the second mirror current unit 220 includes a current-type DAC corresponding to the green sub-pixels, and the third mirror current unit 230 includes a current-type DAC corresponding to the blue sub-pixels.

In the present embodiment, the pixel drive circuit 110 also includes a reference current line Iref. The reference current line Iref is electrically connected to the gates of the third transistor T3 and the fourth transistor T4. Additionally, in each column of the sub-pixel units 10, there is one reference current line Iref. The reference current line Iref transmits a reference current output from the mirror current unit to the gate of each third transistor T3 in the same column of the sub-pixel units 10.

In the present embodiment, the first transistor T1, the second transistor T2, and the third transistor T3 are P-type transistors, the fourth transistor T4 is a P-type transistor, and the fifth transistor T5 and the sixth transistor T6 are N-type transistors.

The operating principle of the circuit diagram in FIG. 4 is described below.

In a first phase, when the low level transmitted from the data signal source Data turns on the second transistor T2. The data signal source transmits a low level to the first node Q through the source of the second transistor T2, so that the first transistor T1 is turned on. Simultaneously, the storage capacitor Cst begins to charge. Meanwhile, the digital-to-analog converter 700 receives data from registers and transmits a current signal to the current source 240, so that the current source 240 outputs an initial reference current $Iref_0$.

The mirror current units in this embodiment can accurately replicate the required currents based on the W/L ratios of the corresponding transistors. For example, the fifth transistor T5 and the sixth transistor T6 constitute the first-stage mirror current circuit. By adjusting the W/L parameters of the fifth transistor T5 and the sixth transistor T6, the current flowing through the fifth transistor T5 can be set to $k_1*Iref_0$, where $k_1=(W5/L5)/(W6/L6)$.

At the same time, the third transistor T3 and the fourth transistor T4 form the second-stage mirror current circuit. By adjusting the W/L parameters of the third transistor T3 and the fourth transistor T4, the current flowing through the third transistor T3 can be set to $k_1*k_2*Iref_0$, where $k2=(W3/L4)/(W4/L4)$.

Therefore, as the first transistor T1 is turned on, the current flowing through the third transistor T3 is transmitted through the source and the drain of the first transistor T1 to the light-emitting device LED, causing the LED to emit light. The driving current of the LED is positively correlated to the initial reference current Iref0 output by the current source 240.

In a second phase, the storage capacitor Cst discharges to maintain the potential at the first node Q, allowing the first transistor T1 to remain on, and consequently, the light-emitting device LED continues emitting light.

In the present embodiment, the present application can control the luminous brightness of the LED light-emitting device in each corresponding sub-pixel unit 10 by adjusting the reference current output from the mirror current unit. For different color sub-pixel units 10, different reference currents can be set. For example, under the color coordinate specifications of W (0.300, 0.315), R (0.682, 0.317), G (0.250, 0.710), B (0.138, 0.051), the luminous flux ratio of RGB is ΦR:ΦG:ΦB=3.18:9.27:1. Referring to the structure in FIG. 6 for specific details, horizontal widths represent the illumination durations, i.e., the display grayscales, of different color sub-pixel units 10. Vertical heights represent the luminous brightness, i.e., the luminous fluxes, of different color sub-pixels 10. Different luminous fluxes correspond to different driving currents for the LED light-emitting devices. By adjusting different reference currents output from the mirror current units. the light-emitting devices of different colors have different luminous fluxes, and the desired ratio of luminous flux for RGB sub-pixel units 10 can be achieved to meet the ratio requirement for white light.

In the display backplane 100 of this application, the signal receiving module 111 includes a first receiving module and a second receiving module. A first end of the first receiving module and a first end of the second receiving module are connected to a scan signal source Scan. A second end of the first receiving module is connected to a first data signal source Data1, and a second end of the second receiving module is connected to a second data signal source Data2. A third end of the second receiving module, a first end of the signal storage module 112, and a first end of the switch module 113 are connected to a second node M. A third end of the first receiving module and a second end of the signal storage module 112 are connected to a third node N. A second end of the switch module 113 is connected to the adjustment module 114. A third end of the switch module 113 is connected to the light-emitting device LED. A third end of the signal storage module 112 and the adjustment module 114 are connected to a constant voltage high-level source VDD.

Figure 5:
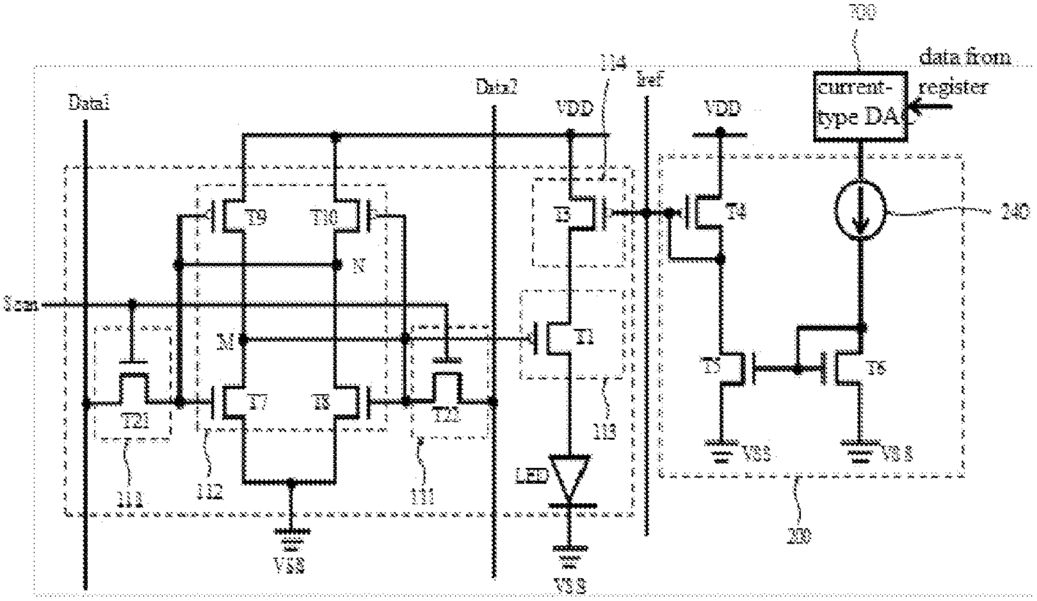
FIG. 5 is a connection diagram illustrating a second type connection between the pixel drive circuit and the mirror current unit in the display backplane of the present application.

Please refer to FIG. 5. The switch module 113 includes a first transistor T1. The first signal receiving module includes a first receiving transistor T21, and the second signal receiving module includes a second receiving transistor T22. The adjustment module 114 includes a third transistor T3. The signal storage module 112 includes a seventh transistor T7, an eighth transistor T8, a ninth transistor T9, and a tenth transistor T10.

Please refer to FIG. 5. A gate of the first receiving transistor T21 is connected to the scan signal source. A source of the first receiving transistor T21 is connected to the first data signal source Data1. A drain of the first receiving transistor T21 is connected to a gate of the seventh transistor T7, a gate of the ninth transistor T9, a source of the eighth transistor T8, and a drain of the tenth transistor T10. A gate of the second receiving transistor T22 is connected to the scan signal source. A source of the second receiving transistor T22 is connected to the second data signal source Data2. A drain of the second receiving transistor T22 is connected to a gate of the eighth transistor T8, a gate of the tenth transistor T10, a source of the seventh transistor T7, a drain of the ninth transistor T9, and a gate of the first transistor T1. Drains of the seventh transistor T7 and the eighth transistor T8 are connected to the constant voltage low-level source VSS. Sources of the ninth transistor T9 and the tenth transistor T10 are connected to the constant voltage high-level source VDD. A source of the first transistor T1 is connected to a drain of the third transistor T3, and a drain of the first transistor T1 is connected to an anode of the light-emitting device LED. A source of the third transistor T3 is connected to the constant voltage high-level source VDD, and a gate of the third transistor T3 is connected to the mirror current source module 200.

In the present embodiment, the pixel drive circuit 110 further includes a reference current line Iref. The reference current line Iref is electrically connected to a gate of the third transistor T3 and a gate of the fourth transistor T4.

In the present embodiment, the first receiving transistor T21, the second receiving transistor T22, the seventh transistor T7, and the eighth transistor T8 are N-type transistors. The first transistor T1, the third transistor T3, the ninth transistor T9, and the tenth transistor T10 are P-type transistors. The fourth transistor T4 is a P-type transistor, and the fifth transistor T5 and the sixth transistor T6 are N-type transistors.

The operating principle of the circuit diagram in FIG. 5 is described as follows.

During the first phase, the signal storage module 112 is in the data writing phase, the first data signal source Data1 is set to a low level, and the second data signal source Data2 is set to a high level. The scan signal source Scan outputs a high level, which turns on the second receiving transistor T22. The gate of the first transistor T1 is opened by the low level output from the second data signal source Data2. As a result, the current output by the third transistor T3 flows through the first transistor T1 and into the light-emitting device LED.

At the same time, the high level output from the scan signal source Scan turns on the first receiving transistor T21. A gate of the seventh transistor T7 is opened by the high level output from the first data signal source Data1. The second node M between the seventh transistor T7 and the ninth transistor T9 is connected to the constant voltage low-level source VSS, and the second node M maintains a low level. Similarly, a gate of the tenth transistor T10 is opened by the low level output from the second data signal source Data2. The third node N between the eighth transistor T8 and the tenth transistor T10 is connected to the constant voltage high-level source VDD, and the third node N maintains a high level.

During the second phase, the signal storage module 112 is in a reading stage, the low level at the second node M keeps the first transistor T1 open, allowing the light-emitting device LED to continue emitting light.

Compared to the structure in FIG. 4, in this embodiment, two inverters are formed using the seventh transistor T7, the eighth transistor T8, the ninth transistor T9, and the tenth transistor T10. Data signals transmitted by the first data signal source Data1 and the second data signal source Data2 are stored in these two inverters which replace the storage capacitor Cst shown in FIG. 4. Since the capacitance in the storage capacitor Cst can change over time, leading to un stable stored capacitance, the voltage data output by the storage capacitor Cst in the second phase may differ from the voltage data input in the first phase. In contrast, the inverters in FIG. 5 output digital signals that remain stable over time, offering greater stability compared to the storage capacitor.

Secondly, the operating principle of the current mirror unit in FIG. 5 is the same as the operating principle of the current mirror unit in FIG. 4, and the specific operating principle can be referred to in the details about FIG. 4.

It should be noted that the pixel drive circuit 110 in FIGS. 4 and 5 is only an example of the present application, and other pixel drive circuits 110 in this field are also applicable to this application.

Figure 6:
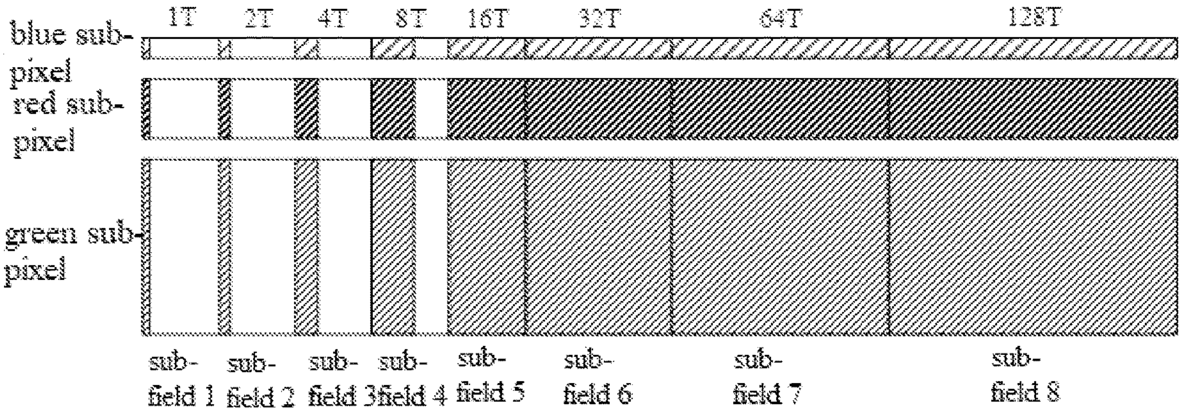
FIG. 6 is a schematic diagram illustrating the RGB color display for one frame in the display backplane of the present application.

Please refer to FIG. 6, which is a schematic diagram illustrating the RGB color display for one frame in the display backplane of the present application. The horizontal widths represent the illumination durations, i.e., the display grayscales, of different color sub-pixel units 10, while the vertical heights represent the luminous brightness, i.e., the luminous fluxes, of different color sub-pixel units.

Figure 7:
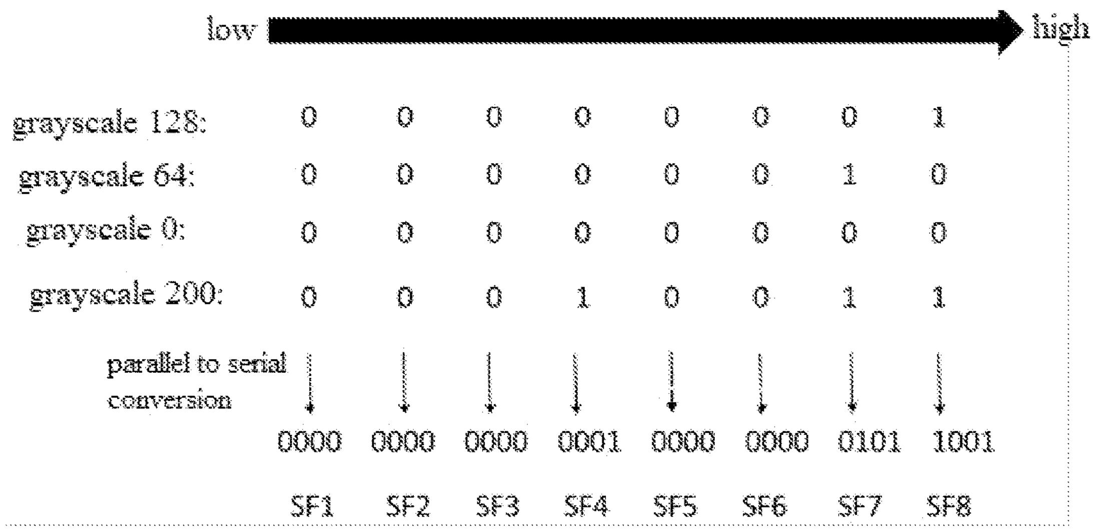
FIG. 7 is a schematic diagram illustrating processing of image data for subfields in the display backplane of the present application.
Figure 8:
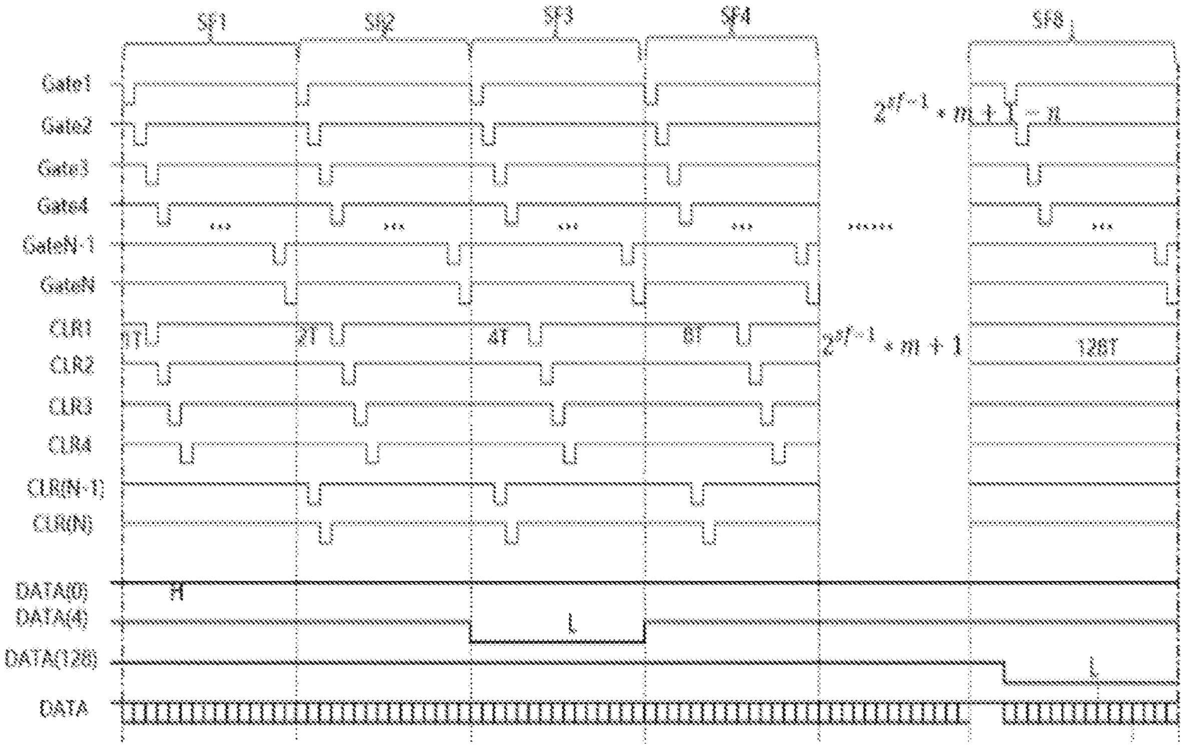
FIG. 8 is a timing diagram illustrating a scanning time sequence for the subfields in the display backplane of this application.

In this embodiment, the illumination duration is achieved through subfield scanning. For example, as illustrated in FIG. 7, grayscale L200 corresponds to the binary 00010011, grayscale L128 corresponds to the digital signal 00000001, grayscale L64 corresponds to the binary 00000010, and grayscale L0 corresponds to the binary 00000000. Each grayscale binary value is then converted from parallel to serial. For example, the binary for the 1st subframe SF is 0000, the binary for the 2nd SF is 0000, the binary for the 3rd SF is 0000, the binary for the 4th SF is 0001, the binary for the 5th SF is 0000, the binary for the 6th SF is 0000, the binary for the 7th SF is 0101, and the binary for the 8th SF is 1001. Subsequently, the data for these 8 subframes in one frame are written into the column scanning circuit 600 according to the subframe scanning timing sequence shown in FIG. 8.

Figure 9:
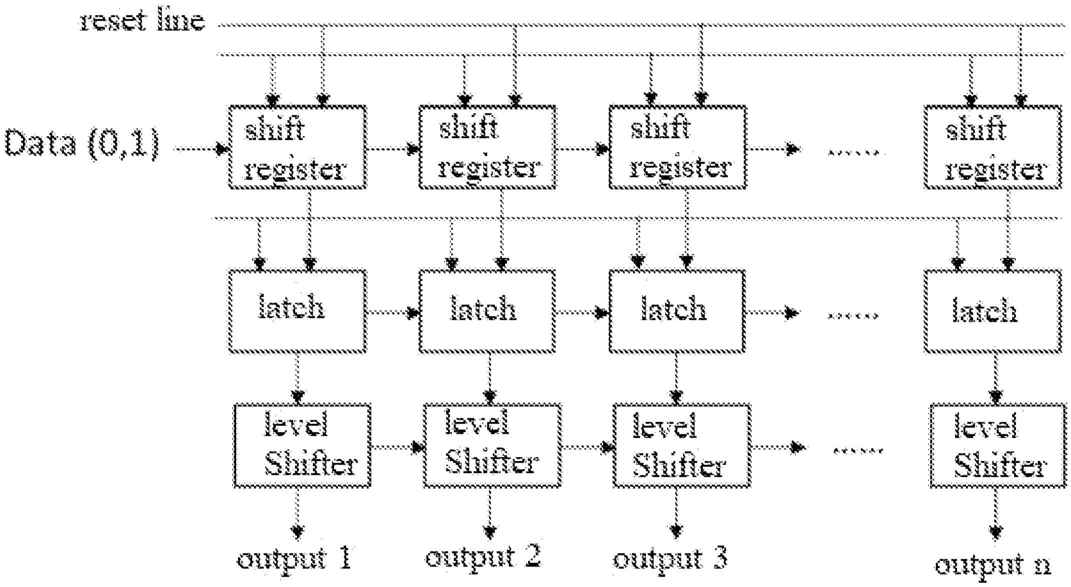
FIG. 9 is a schematic structural diagram illustrating a column scanning circuit in the display backplane of the present application.

Please refer to FIG. 9. FIG. 9 is a structural diagram of the column scanning circuit 600 in the display backplane 100 of the present application. The column scanning circuit 600 can include modules such as a shift register (Shift), a latch, and a level shifter (Level Shift). The shift register and the latch are activated by the corresponding signal lines, and perform serial-to-parallel conversion on the received binary data. The level shifter converts the corresponding voltage states of "0" or "1" into two different voltage levels: one to turn off pixel circuit drive transistors and the other to turn on the pixel circuit drive transistors. These voltage levels are then output from different output ports.

The present application separately controls the luminous flux and grayscale of RGB. The grayscale is controlled using subfield scanning, while the luminous flux is regulated by incorporating the mirror current source module 200, connected to the adjustment module 114 in the pixel drive circuit 110, within the display backplane 100. This allows for the adjustment of the currents input to the light-emitting devices LED in different sub-pixel units 10, resulting in varying luminous fluxes for the light-emitting devices LED of different colors. This enables the display backplane 100 to achieve full-color display at conventional clock frequency.

As the resolution of the display device increases, the number of sub-pixel units 10 on the display backplane 100 is larger. This results in differences in the potentials received by the gates of the third transistors T3 of the sub-pixel units 10 located farther from the current source. For example, in the structure of FIG. 3, different reference currents are transmitted from the mirror current source module 200 to the sub-pixel units 10 in different columns, leading to display non-uniformity issues.

Figure 10:
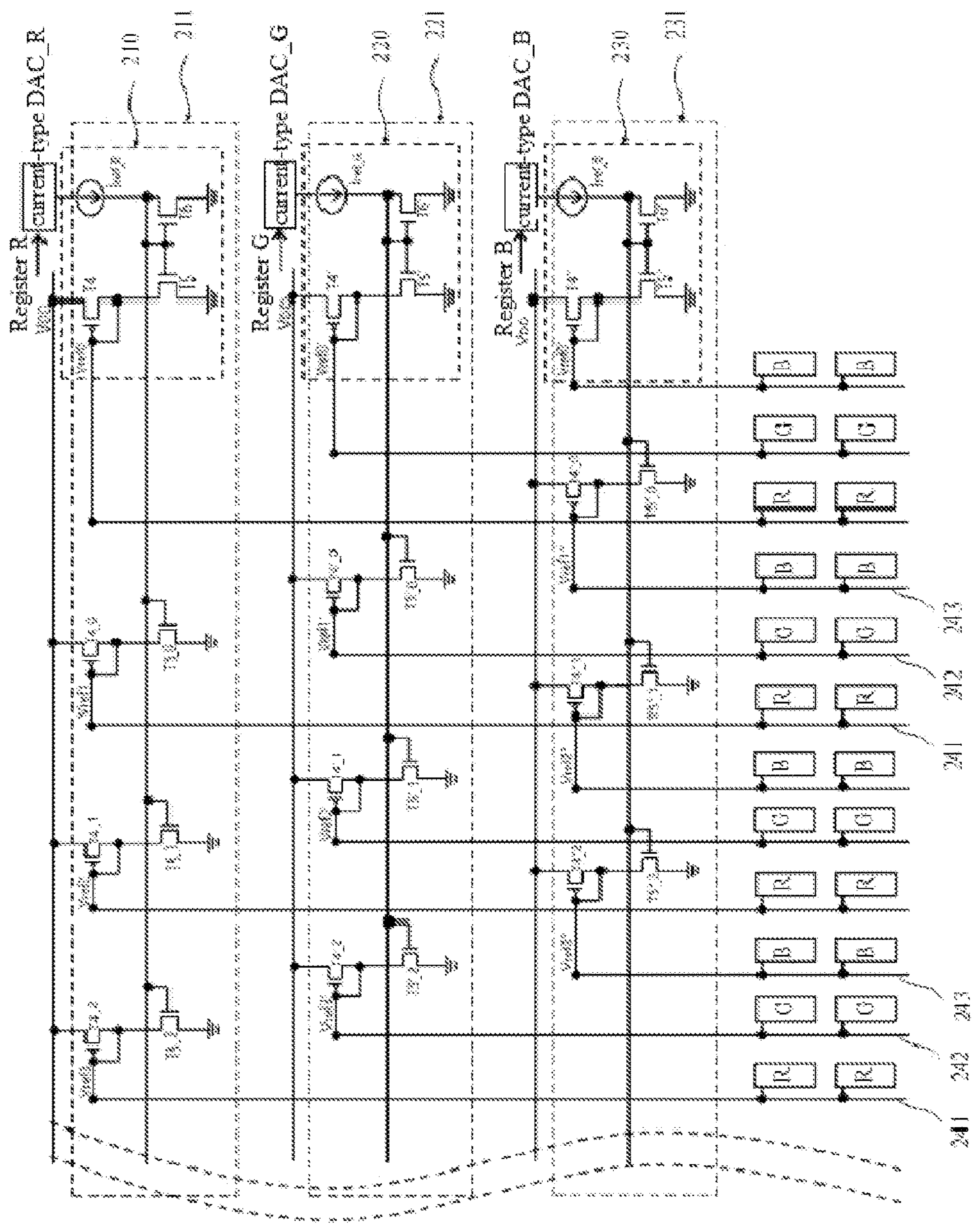
FIG. 10 is a schematic diagram illustrating a second type of the mirror current source module and its circuit connection in the display backplane of the present application.

Please refer to FIG. 10. The mirror current source module 200 can include cascaded multiple first mirror current units 210, cascaded multiple second mirror current units 220, and cascaded multiple third mirror current units 230. Cascaded multiple first mirror current units 210 constitute a first mirror current group 211, cascaded multiple second mirror current units 220 constitute a second mirror current group 221, and cascaded multiple third mirror current units 230 constitute a third mirror current group 231. Each first mirror current unit 210 is electrically connected to the adjustment modules 114 of a column of the first sub-pixel units 101, each second mirror current unit 220 is electrically connected to the adjustment modules 114 of a column of the second sub-pixel units 102, and each third mirror current unit 230 is electrically connected to the adjustment modules 114 of a column of the third sub-pixel units 103.

Compared to the structure in FIG. 3, this embodiment is provided with the same number of mirror current units as the number of transmission lines. Each mirror current unit is connected to one transmission line. The quantity of the first transmission lines 241 matches the quantity of the first mirror current units 210, the quantity of the second transmission lines 242 matches the quantity of the second mirror current units 220, and the quantity of the third transmission lines 243 matches the quantity of the third mirror current units 230.

In this embodiment, any two of the first transmission lines 241 are separated, any two of the second transmission lines 242 are separated, and any two of the third transmission lines 243 are separated.

In the present embodiment, due to the cascaded arrangement of the mirror current units, the current source 240 and the sixth transistor T6 are shared by each mirror current unit. The fourth transistor T4 and the fifth transistor T5 within each mirror current unit replicate the reference current generated by the current source 240 and transmit the replicated reference current to the corresponding third transistor T3. The cascaded mirror current units ensure that each column of the sub-pixel units 10 has an independent reference current, addressing technical issues arising from variations in the potential received by the gate of the third transistor T3 due to differences in transmission distances. Furthermore, having an independent reference current for each column of sub-pixel units 10 enhances the stability of the pixel drive circuit 110.

Figure 11:
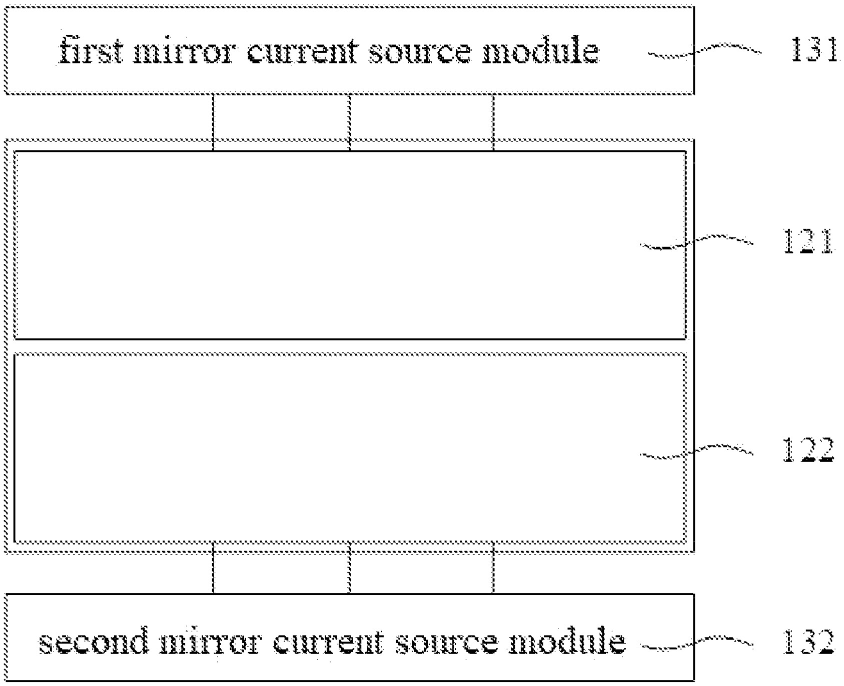
FIG. 11 is a schematic diagram illustrating a third type of the mirror current source module and its circuit connection in the display backplane of the present application.

Please refer to FIG. 11, in the display backplane 100 of the present application, the sub-pixel units 10 include a first sub-pixel group 121 and a second sub-pixel group 122 arranged along the column direction. The display backplane 100 includes a first mirror current source module 131 and a second mirror current source module 132 positioned on two sides of the sub-pixel units 10. The first mirror current source module 131 is electrically connected to the adjustment modules 114 in the first sub-pixel group 121, and the second mirror current source module 132 is electrically connected to the adjustment modules 114 in the second sub-pixel group 122.

Based on FIG. 10, since the display backplane 100 has a larger number of sub-pixel units 10 in the column direction, and due to the effect of metal line impedance, there are variations in the potential received by the gate of the third transistors T3 in the sub-pixels located farther from the mirror current units in the same column. In this embodiment, the sub-pixels in the display panel 100 are divided into upper and lower regions. The gates of the third transistors T3 in the first sub-pixel group 121 are connected to the first mirror current source module 131, while the gates of the third transistors T3 in the second sub-pixel group 122 are connected to the second mirror current source module 132. This reduces the number of the sub-pixel units 10 connected to each mirror current unit. Compared to FIG. 10, the sub-pixel units 10 connected to each mirror current unit in FIG. 11 is reduced by one-half. Consequently, a length of the corresponding transmission line is reduced by one-half, addressing the technical issue of variations in the potential received by the gate of the third transistor T3 due to transmission line impedance.

In the present embodiment, the pixel drive circuit 110 and the mirror current source module 200 in FIGS. 10 and 11 can be the same as the pixel drive circuit 110 and the mirror current source module 200 in FIGS. 4 and 5.

The present application further provides a display device. The display device includes a terminal body and the aforementioned display backplane, with the terminal body and the display panel combined into one unit. For example, when the display backplane serves as a backlight source, the terminal body can be a liquid crystal display panel, and the display backplane and the liquid crystal display panel are combined to form a display device. When the display backplane serves as a direct display device, the terminal body can be a circuit board or other devices attached to the display panel, along with a cover placed on top of the display panel. The display device can include electronic devices such as mobile phones, televisions, laptops, and more.

It can be understood that, those of ordinary skill in the art can make equivalent substitutions or changes based on the technical solutions and inventive concepts of the present application, and all such changes or substitutions should fall within the protection scope of the appended claims of the present application.

What is claimed is:

1. A display backplane, comprising:

a plurality of sub-pixel units, each of the sub-pixel units comprising a pixel drive circuit and a light-emitting device, wherein in each sub-pixel unit, the pixel drive circuit comprises a signal receiving module, a signal storage module, a switch module, and an adjustment module, the signal receiving module receives a data signal from a data signal source and transmits the data signal to the signal storage module and the switch module, the signal storage module is configured to store the data signal, the switch module is configured to transmit an adjustment current from the adjustment module to the light-emitting device, wherein the signal receiving module comprises a first receiving module and a second receiving module, the first receiving module comprises a first receiving transistor, the second receiving module comprises a second receiving transistor, the switch module comprises a first transistor, the adjustment module comprises a third transistor, and the signal storage module comprises a seventh transistor, an eighth transistor, a ninth transistor, and a tenth transistor; and a mirror current source module, electrically connected to the adjustment modules of the pixel drive circuits, wherein the mirror current source module is configured to adjust the adjustment currents input to the adjustment modules;

wherein the sub-pixel units comprise a plurality of first sub-pixel units, a plurality of second sub-pixel units, and a plurality of third sub-pixel units, wherein the first sub-pixel units, the second sub-pixel units, and the third sub-pixel unit emit different colors, and wherein the mirror current source module inputs different adjustment currents to the adjustment modules of the first sub-pixel units, the second sub-pixel units, and the third sub-pixel units;

wherein the mirror current source module comprises a first mirror current unit, a second mirror current unit, and a third mirror current unit, each mirror current unit in the mirror current source module comprising a current source, a fourth transistor, a fifth transistor, and a sixth transistor; the first mirror current unit is connected to the adjustment modules of at least one column of the first sub-pixel units; the second mirror current unit is electrically connected to the adjustment modules of at least one column of the second sub-pixel units; and the third mirror current unit is electrically connected to the adjustment modules of at least one column of the third sub-pixel units;

wherein the display backplane further comprises a plurality of first transmission lines, a plurality of second transmission lines, and a plurality of third transmission lines, wherein the first mirror current unit is electrically connected to the corresponding adjustment modules through the first transmission lines, the second mirror current unit is electrically connected to the corresponding adjustment modules through the second transmission lines, and the third mirror current unit is electrically connected to the corresponding adjustment modules through the third transmission lines, and wherein the first transmission lines, the second transmission lines, and the third transmission lines are arranged in different layers;

wherein a first end of the first receiving module and a first end of the second receiving module are connected to a scan signal source; a second end of the first receiving module is connected to a first data signal source, and a second end of the second receiving module is connected to a second data signal source; a third end of the second receiving module, a first end of the signal storage module, and a first end of the switch module are connected to a second node; a third end of the first receiving module and a second end of the signal storage module are connected to a third node N; a second end of the switch module is connected to the adjustment module, a third end of the switch module is connected to the light-emitting device, and a third end of the signal storage module and the adjustment module are connected to a constant voltage high-level source.

2. The display backplane according to claim 1, wherein the mirror current source module comprises cascaded multiple first mirror current units, cascaded multiple second mirror current units, and cascaded multiple third mirror current units; and one of the first mirror current units is electrically connected to the adjustment modules of one column of the first sub-pixel units, one of the second mirror current units is electrically connected to the adjustment modules of one column of the second sub-pixel units, and one of the third mirror current units is electrically connected to the adjustment modules of one column of the third sub-pixel units.

3. The display backplane according to claim 1, wherein the sub-pixel units comprise a first sub-pixel group and a second sub-pixel group arranged along a column direction; and the display backplane comprises a first mirror current source module and a second mirror current source module mirrored on two sides of the sub-pixel units, the first mirror current source module is electrically connected to the adjustment modules of the first sub-pixel group, and the second mirror current source module is electrically connected to the adjustment modules in the second sub-pixel group.

4. The display backplane according to claim 1, wherein a gate of the first receiving transistor is connected to the scan signal source, a source of the first receiving transistor is connected to a first data signal source, and a drain of the first receiving transistor is connected to a gate of the seventh transistor, a gate of the ninth transistor, a source of the eighth transistor, and a drain of the tenth transistor;

a gate of the second receiving transistor is connected to a scan signal source, a source of the second receiving transistor is connected to a second data signal source, and a drain of the second receiving transistor is connected to a gate of the eighth transistor, a gate of the tenth transistor, a source of the seventh transistor, and a drain of the ninth transistor, and a gate of the first transistor;

drains of the seventh transistor and the eighth transistor are connected to a constant voltage low-level source; sources of the ninth transistor and the tenth transistor are connected to a constant voltage high-level source; a source of the first transistor is connected to a drain of the third transistor, and a drain of the first transistor is connected to an anode of the light-emitting device; a source of the third transistor is connected to the constant voltage high-voltage source; and a gate of the third transistor is connected to the mirror current source module.

5. The display backplane according to claim 4, wherein the first receiving transistor, the second receiving transistor, the seventh transistor, and the eighth transistor are N-type transistors, and the first transistor, the third transistor, the ninth transistor, and the tenth transistor are P-type transistors.

6. The display backplane according to claim 4, wherein a first end of the current source is connected to a digital-to-analog converter; a second end of the current source is connected to a gate of the fifth transistor, a gate of the sixth transistor, and a source of the sixth transistor; drains of the fifth transistor and the sixth transistor are connected to a constant voltage low-level source; a source of the fifth transistor is connected to the gate of the third transistor, a gate of the fourth transistor, and a drain of the fourth transistor; and a source of the fourth transistor is connected to the constant voltage high-level source.

7. The display backplane according to claim 6, wherein the fourth transistor is a P-type transistor, and the fifth transistor and the sixth transistor are N-type transistors.

8. The display backplane according to claim 6, wherein the pixel drive circuit further comprises a reference current line, and the reference current line is electrically connected to the gate of the third transistor and a gate of the fourth transistor.

9. The display backplane according to claim 1, further comprising a timing controller, a data processor, a row scanning circuit, and a column scanning circuit; the row scanning circuit is connected to scan lines in the display backplane, and the column scanning circuit is connected to data lines in the display backplane; the timing controller transmits scan signals to the row scanning circuit and controls the data processor to transmit data signals to the column scanning circuit.

10. The display backplane according to claim 1, wherein each sub-pixel unit comprises multiple frames of display data, each frame of display data comprises multiple subframes, each subframe comprises a data writing phase and an illumination phase, and an illumination duration during the illumination phase varies among different subframes; and for each sub-pixel unit, when the data signal received by the sub-pixel unit during the data writing phase from the data signal source is at a high level, the sub-pixel unit continuously emits light during the corresponding illumination phase, and when the data signal received by the sub-pixel unit during the data writing phase from the data signal source is at a low level, the sub-pixel unit does not emit light during the corresponding illumination phase.

11. The display backplane according to claim 1, wherein each sub-pixel unit comprises multiple frames of display data, each frame of display data comprises multiple subframes, each subframe comprises a data writing phase and an illumination phase, and an illumination duration during the illumination phase varies among different subframes; and for each sub-pixel unit, when the data signal received by the sub-pixel unit during the data writing phase from the data signal source is at a low level, the sub-pixel unit continuously emits light during the corresponding illumination phase, and when the data signal received by the sub-pixel unit during the data writing phase from the data signal source is at a high level, the sub-pixel unit does not emit light during the corresponding illumination phase.

12. A display device, comprising a display backplane, the display backplane comprising:

a plurality of sub-pixel units, each of the sub-pixel units comprising a pixel drive circuit and a light-emitting device, wherein in each sub-pixel unit, the pixel drive circuit comprises a signal receiving module, a signal storage module, a switch module, and an adjustment module, the signal receiving module receives a data signal from a data signal source and transmits the data signal to the signal storage module and the switch module, the signal storage module is configured to store the data signal, the switch module is configured to transmit an adjustment current from the adjustment module to the light-emitting device, wherein the signal receiving module comprises a first receiving module and a second receiving module, the first receiving module comprises a first receiving transistor, the second receiving module comprises a second receiving transistor, the switch module comprises a first transistor, the adjustment module comprises a third transistor, and the signal storage module comprises a seventh transistor, an eighth transistor, a ninth transistor, and a tenth transistor; and a mirror current source module, electrically connected to the adjustment modules of the pixel drive circuits, wherein the mirror current source module is configured to adjust the adjustment currents input to the adjustment modules;

wherein the sub-pixel units comprise a plurality of first sub-pixel units, a plurality of second sub-pixel units, and a plurality of third sub-pixel units, wherein the first sub-pixel units, the second sub-pixel units, and the third sub-pixel unit emit different colors, and wherein the mirror current source module inputs different adjustment currents to the adjustment modules of the first sub-pixel units, the second sub-pixel units, and the third sub-pixel units;

wherein the mirror current source module comprises a first mirror current unit, a second mirror current unit, and a third mirror current unit, each mirror current unit in the mirror current source module comprising a current source, a fourth transistor, a fifth transistor, and a sixth transistor; the first mirror current unit is connected to the adjustment modules of at least one column of the first sub-pixel units; the second mirror current unit is electrically connected to the adjustment modules of at least one column of the second sub-pixel units; and the third mirror current unit is electrically connected to the adjustment modules of at least one column of the third sub-pixel units;

wherein the display backplane further comprises a plurality of first transmission lines, a plurality of second transmission lines, and a plurality of third transmission lines, wherein the first mirror current unit is electrically connected to the corresponding adjustment modules through the first transmission lines, the second mirror current unit is electrically connected to the corresponding adjustment modules through the second transmission lines, and the third mirror current unit is electrically connected to the corresponding adjustment modules through the third transmission lines, and wherein the first transmission lines, the second transmission lines, and the third transmission lines are arranged in different layers;

wherein a first end of the first receiving module and a first end of the second receiving module are connected to a scan signal source; a second end of the first receiving module is connected to a first data signal source, and a second end of the second receiving module is connected to a second data signal source; a third end of the second receiving module, a first end of the signal storage module, and a first end of the switch module are connected to a second node; a third end of the first receiving module and a second end of the signal storage module are connected to a third node N; a second end of the switch module is connected to the adjustment module, a third end of the switch module is connected to the light-emitting device, and a third end of the signal storage module and the adjustment module are connected to a constant voltage high-level source.

13. A display device, comprising a display backplane, the display backplane comprising:

a plurality of sub-pixel units, each of the sub-pixel units comprising a pixel drive circuit and a light-emitting device, wherein in each sub-pixel unit, the pixel drive circuit comprises a signal receiving module, a signal storage module, a switch module, and an adjustment module, the signal receiving module receives a data signal from a data signal source and transmits the data signal to the signal storage module and the switch module, the signal storage module is configured to store the data signal, the switch module is configured to transmit an adjustment current from the adjustment module to the light-emitting device, wherein the signal receiving module comprises a first receiving module and a second receiving module, the first receiving module comprises a first receiving transistor, the second receiving module comprises a second receiving transistor, the switch module comprises a first transistor, the adjustment module comprises a third transistor, and the signal storage module comprises a seventh transistor, an eighth transistor, a ninth transistor, and a tenth transistor; and a mirror current source module, electrically connected to the adjustment modules of the pixel drive circuits, wherein the mirror current source module is configured to adjust the adjustment currents input to the adjustment modules;

wherein the sub-pixel units comprise a plurality of first sub-pixel units, a plurality of second sub-pixel units, and a plurality of third sub-pixel units, wherein the first sub-pixel units, the second sub-pixel units, and the third sub-pixel unit emit different colors, and wherein the mirror current source module inputs different adjustment currents to the adjustment modules of the first sub-pixel units, the second sub-pixel units, and the third sub-pixel units;

wherein the mirror current source module comprises a first mirror current unit, a second mirror current unit, and a third mirror current unit, each mirror current unit in the mirror current source module comprising a current source, a fourth transistor, a fifth transistor, and a sixth transistor; the first mirror current unit is connected to the adjustment modules of at least one column of the first sub-pixel units; the second mirror current unit is electrically connected to the adjustment modules of at least one column of the second sub-pixel units; and the third mirror current unit is electrically connected to the adjustment modules of at least one column of the third sub-pixel units;

wherein the display backplane further comprises a plurality of first transmission lines, a plurality of second transmission lines, and a plurality of third transmission lines, wherein the first mirror current unit is electrically connected to the corresponding adjustment modules through the first transmission lines, the second mirror current unit is electrically connected to the corresponding adjustment modules through the second transmission lines, and the third mirror current unit is electrically connected to the corresponding adjustment modules through the third transmission lines;

wherein a first end of the first receiving module and a first end of the second receiving module are connected to a scan signal source; a second end of the first receiving module is connected to a first data signal source, and a second end of the second receiving module is connected to a second data signal source; a third end of the second receiving module, a first end of the signal storage module, and a first end of the switch module are connected to a second node; a third end of the first receiving module and a second end of the signal storage module are connected to a third node N; a second end of the switch module is connected to the adjustment module, a third end of the switch module is connected to the light-emitting device, and a third end of the signal storage module and the adjustment module are connected to a constant voltage high-level source.

* * * * *